United States Patent [19]
Dearnaley

[11] Patent Number: 5,976,711
[45] Date of Patent: Nov. 2, 1999

[54] BEARING SURFACES OF HYPEREUTECTIC ALLOYS MODIFIED TO INCREASE LUBRICANT EFFECTIVENESS

[75] Inventor: Geoffrey Dearnaley, San Antonio, Tex.

[73] Assignee: Southwest Research Institute, San Antonio, Tex.

[21] Appl. No.: 09/017,836

[22] Filed: Feb. 3, 1998

[51] Int. Cl.⁶ .............................. B32B 15/20; F16C 32/12
[52] U.S. Cl. ........................ 428/641; 428/651; 428/661; 384/913
[58] Field of Search ...................................... 428/446, 688, 428/689, 641, 651, 661, 660, 662, 472, 472.1, 624; 384/913

[56] References Cited

U.S. PATENT DOCUMENTS

| | | |
|---|---|---|
| 4,241,135 | 12/1980 | Lee et al. . |
| 4,943,485 | 7/1990 | Allam et al. . |
| 5,237,967 | 8/1993 | Willermet et al. . |
| 5,255,433 | 10/1993 | Jin et al. . |
| 5,523,050 | 6/1996 | Lloyd et al. . |
| 5,593,719 | 1/1997 | Dearnaley et al. . |
| 5,648,620 | 7/1997 | Stenzel et al. . |

*Primary Examiner*—Deborah Jones
*Assistant Examiner*—Jason Savage
*Attorney, Agent, or Firm*—Paula D. Morris & Associataes, P.C.

[57] ABSTRACT

The surfaces of silicon protrusions from hypereutectic alloy bearing surfaces are converted to a highly stable metal silicides which are more effectively lubricated by conventional polar lubricant additives.

11 Claims, No Drawings

BEARING SURFACES OF HYPEREUTECTIC ALLOYS MODIFIED TO INCREASE LUBRICANT EFFECTIVENESS

FIELD OF THE INVENTION

The present invention relates to hypereutectic alloy bearing surfaces comprising silicon protrusions comprising surfaces converted into metal silicide to increase the lubricating effectiveness of conventional lubricant additives at such surfaces.

BACKGROUND OF THE INVENTION

Moving components of engines, such as pistons, cylinders, and rocker arms, often are fabricated from hypereutectic alloys of aluminum and silicon. These hypereutectic alloys typically contain in the range of from about 16% to about 23% by weight silicon—an amount that is far beyond the solid solubility level for the silicon in the alloy. As a result, excess silicon tends to precipitate as angular particles generally about 10 microns in size. After the component is manufactured, an electrochemical etch typically is used to remove some of the aluminum matrix at the surface of the component. The etch causes precipitated silicon particles to protrude from the matrix, forming a hard bearing surface.

Bearing surfaces comprising these protruding silicon particles frequently are in frictional contact with a metallic counterfacing surface, such as a chromium-plated piston ring, a steel rocker shaft, or a component made of some other ferrous alloy, such as cast iron. Frictional wear between these counterfacing surfaces remains a serious problem.

The problem is exacerbated by "oil starvation." Current attempts to reduce hydrocarbon emissions from engines often involve the use of less lubricating oil. The resulting "oil starvation" can cause increased wear on the load-bearing surfaces. If increased wear persists, oil can seep past the ring. The result is wear-related hydrocarbon emissions which defeat the purpose of using less lubricating oil in order to reduce emissions.

Methods are needed to alter the load-bearing surfaces to promote the effectiveness of conventional lubricants in preventing tribochemical attrition of silicon and metal.

SUMMARY OF THE INVENTION

The present invention solves the foregoing wear problems by providing a bearing surface comprising silicon comprising an outer surface comprising a metal silicide.

DETAILED DESCRIPTION OF THE INVENTION

Although silicon is a hard material (around 10 Gpa), silicon is not a good bearing material for several reasons. First of all, lubricant additives designed to lubricate steels do not work well on silicon. As a result, the likelihood that the silicon will contact metal at the counterfacing surface is high. Local frictional heating is likely to cause at least temporary surface temperatures in excess of 400° C., particularly at relatively high ambient operating temperatures. These high temperatures promote tribochemical reactions between silicon and the counterfacing metal, which is typically chromium or iron. Under mechanical stress, the surface protective oxides on the silicon and metal can be disrupted, leading to silicide formation. The debris from such reactions is abrasive and induces further wear.

The present invention provides a method for preventing tribochemical attrition of silicon and metal in counterfacing components. Substantially any surface comprising silicon may be treated according to the present method. A preferred surface is a hypereutectic alloy surface, which typically comprises protruding silicon particulates. Components made of hypereutectic alloys are preferred because they are commonly incorporated into machinery which experiences frictional wear and increased temperatures during use. Treatment of the exposed silicon according to the present invention promotes the effectiveness of conventional lubricant additives in lubricating the sliding interaction of such surfaces, particularly with counterfacing metal surfaces.

Conventional lubricant additives typically comprise polar molecules designed to adsorb onto metallic surfaces. The polar molecules have a low affinity for covalently-bonded silicon. The present invention converts the outer surface of silicon at a bearing surface into a very stable metal silicide. The stable metal silicide has a more metallic character than covalently-bonded silicon, and thus has a greater affinity for polar lubricant additives. The metal silicide at the surface of the silicon should allow for electron transfer with polar molecules of the lubricant additives adsorbed onto the surface of the silicon.

The metal silicide formed at the surface of the silicon preferably should be more thermodynamically stable than chromium silicide, iron silicide, or other metal silicides which may be products of tribochemical interactions with the opposed metal surface during sliding wear. Some of the most stable metal silicides are those of titanium, zirconium, hafnium, vanadium, and niobium. Disilicides of these metals have relatively low room temperature electrical resistivities in the range of from about 10 micro-ohm cm to about 70 micro-ohm cm, indicating a metallic character. These relatively low resistivities correlate with a high positive temperature coefficient of resistance for the disilicides, which is further evidence of the metallic character of the disilicides. Preferred metals for forming the metal silicides are selected from the group consisting of vanadium, hafnium, and niobium. These metals have melting points in excess of 2000° C., and their presence should further increase tribochemical stability.

The heat of formation for disilicides of titanium, zirconium, hafnium, vanadium, and niobium (in kilocalories per mole) are 32, 38, 54, 75, and 33, respectively. In contrast, the heat of formation for disilicides of chromium and iron are only 29.4 and 19.4, respectively. The comparatively high heat of formation for disilicides of titanium, zirconium, hafnium, vanadium, and niobium, indicates that these disilicides will be very difficult to break down into their component atoms during sliding wear. The formation of these stable metal suicides at the surface of the silicon essentially renders the surface silicon unavailable to form chromium and/or iron suicides during sliding wear. As a result, counterfacing metal surfaces will experience reduced tribochemical attrition of chromium and/or iron.

A number of methods may be used to form the metal silicide at the surface of the silicon. The method must provide sufficient energy to cause interdiffusion between molecules of the selected metal and molecules of the silicon. The energy also must be sufficient to cause the metal atoms and the silicon atoms to react to form the corresponding metal silicide. Suitable methods which should supply sufficient energy to form a desired metal silicide without damaging the aluminum or other metal at the bearing surface include, but are not necessarily limited to, non-thermal processes. Suitable non-thermal processes could impart the necessary energy in a number of ways, including but not necessarily limited to "bombardment" techniques, in which the metal coating is bombarded with ions or electrons, and light energy techniques, in which the metal coating is flashed away with light energy, such as laser energy. Suitable "bombardment" techniques include but are not necessarily limited to ion beam mixing using vaporized metal or a beam of metal ions as a metal source, electron beam assisted vapor deposition, plasma assisted processes, such as plasma vapor deposition and chemical vapor deposition, and any other ion plating techniques. The use of too stringent or too energetic a method could damage the bearing surface.

A preferred method is ion beam mixing using a vapor deposited metal source. To perform this method, the component is placed in a vacuum and positioned for ease in condensing a vaporized stream of the chosen metal onto the desired bearing surface. A metal selected from the group consisting of titanium, zirconium, hafnium, vanadium, and niobium should be vaporized using any suitable means. Such means include, but are not necessarily limited to heating in a hearth to the vaporization point, and vaporizing by bombardment of the metal with an electron beam. The vaporized stream of metal should be directed toward the bearing surface and condensed onto the surface. In order to promote condensation of a film of the vaporized metal onto the bearing surface, the pressure should be maintained in the range of from about $10^{-4}$ to about $10^{-5}$ torr, preferably about $10^{-5}$ torr or less, and the temperature of the substrate should be in the range of from about 200° C. to about 500° C. The metal should be condensed onto the bearing surface until a metal film is formed. The metal film preferably should have a thickness in the range of from about 50 nm to about 250 nm.

The substrate should be subjected to a source of energy sufficient to cause interdiffusion and reaction of the metal and silicon atoms. The energy may be applied after vapor deposition, but preferably substantially simultaneously with the vapor deposition. Substantially simultaneous treatment is possible where the type of energy applied will not interfere with condensation of the metal onto the desired surface. In a preferred embodiment, the surface bearing the metal film is bombarded with a beam of ions having an energy in the range of from about 50 keV to about 200 keV to achieve an ion dose in the range of from about $3 \times 10^{17}$ to about $3 \times 10^{18}$ ions/cm$^2$, or until substantially all of the metal film is converted into metal silicide. The conversion can be monitored by the frequency change of a quartz crystal oscillator. The metal silicide should be thick enough to promote lubricant effectiveness. A thickness in the range of from about 25 nm to about 250 nm should suffice.

Suitable ions for the ion beam include, but are not necessarily limited to argon, silicon, methane, helium, or neon. Preferred ions are argon ions. The point defects produced by the ion bombardment are believed to induce rapid interdiffusion. In most cases, silicon is the dominant diffusing species; however, some metal atoms (Co, Ni, V) contribute to the transport mechanism.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

I claim:

1. A hypereutectic alloy bearing surface comprising silicon protrusions comprising an outer surface comprising a first metal silicide film comprising a first metal said bearing surface being in frictional contact with a second surface comprising a second metal, said first metal silicide having greater thermodynamic stability than a second metal silicide comprising said second metal.

2. The hypereutectic alloy bearing surface of claim 1 wherein said first metal silicide further comprises a lubricant coating.

3. The hypereutectic alloy bearing surface of claim 2 wherein said lubricant coating is polar in nature.

4. The bearing surface of claim 2 wherein said first metal is selected from the group consisting of vanadium, hafnium, and niobium.

5. The hypereutectic allow bearing surface of claim 4 wherein said lubricant coating is polar in nature.

6. The hypereutectic alloy bearing surface of claim 1 wherein said first metal silicide comprises metal selected from the group consisting of titanium, zirconium, hafnium, vanadium, and niobium.

7. The hypereutectic alloy bearing surface of claim 1 wherein said first metal silicide comprises a metal selected from the group consisting of vanadium, hafnium, and niobium.

8. A Hypereutectic alloy bearing surface comprising:

silicon protrusions comprising an outer surface comprising a first metal silicide film and a lubricant coating, wherein said first metal silicide film comprises a first metal selected from the group consisting of titanium, zirconium, vanadium, hafnium, and niobium;

wherein said hypereutectic alloy bearing surface frictionally contacts a second surface comprising a send metal, wherein said first metal silicide film comprises great thermodynamic stability than a second metal silicide comprising said second metal.

9. The hypereutectic alloy bearing surface of claim 8 wherein said lubricant coating is polar in nature.

10. A hypereutectic alloy bearing surface made by a process comprising:

depositing a film comprising a first metal on a bearing surface comprising silicon protrusions, said bearing surface frictionally contacting a second surface comprising a second metal;

reacting said first metal with said silicon protrusions to form a first metal silicide film at said bearing surface, said first metal silicide film exhibiting greater thermodynamic stability than a second metal silicide film comprising said second metal.

11. The hypereutectic alloy bearing surface of claim 10 wherein said process further comprises adsorbing onto said first metal silicide film a polar lubricant.

* * * * *